May 14, 1935.  G. R. HAUB  2,001,460
APPARATUS FOR FORMING PLATES
Filed Aug. 27, 1931  5 Sheets-Sheet 1
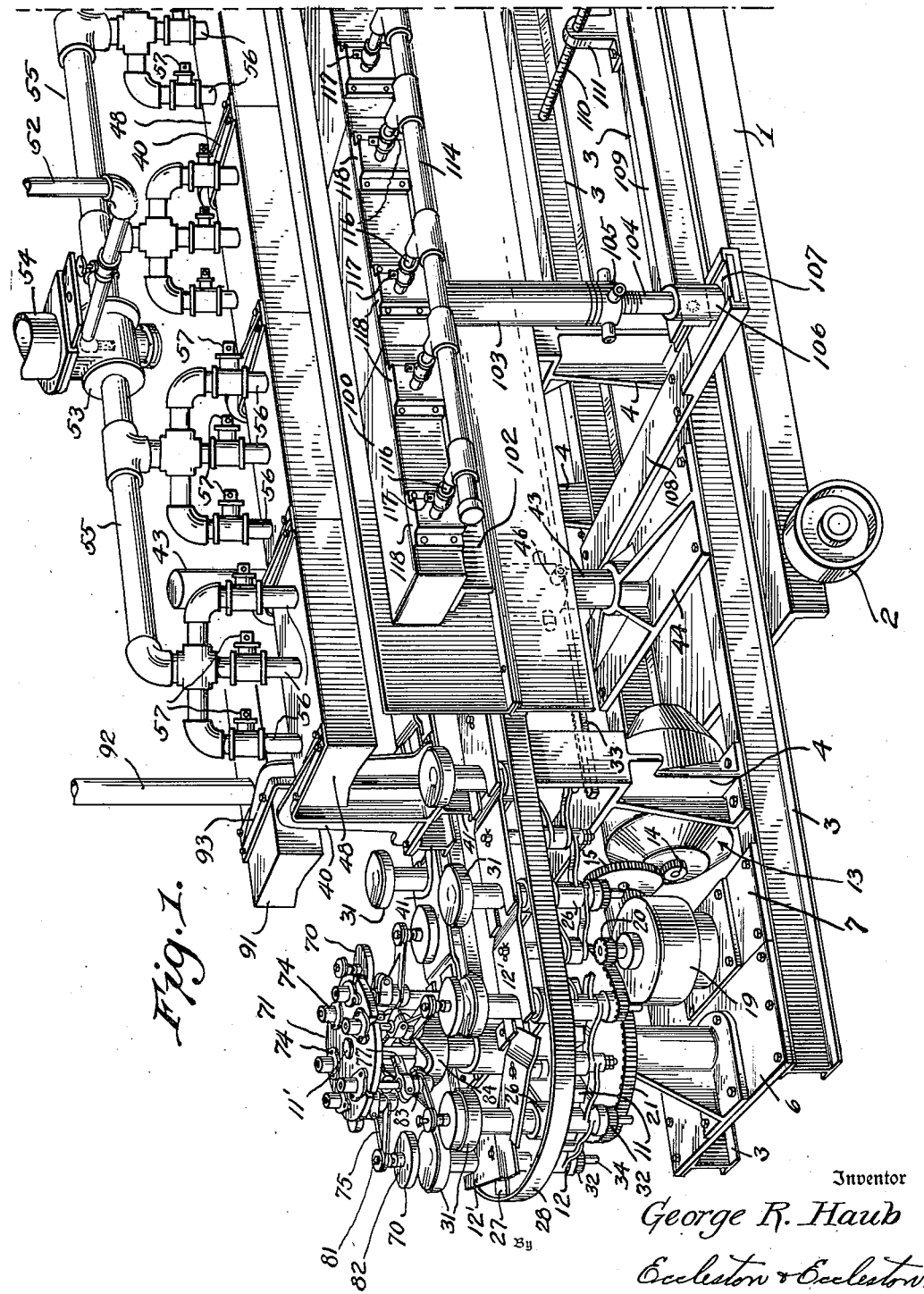
Inventor
George R. Haub
By Eccleston & Eccleston,
Attorneys

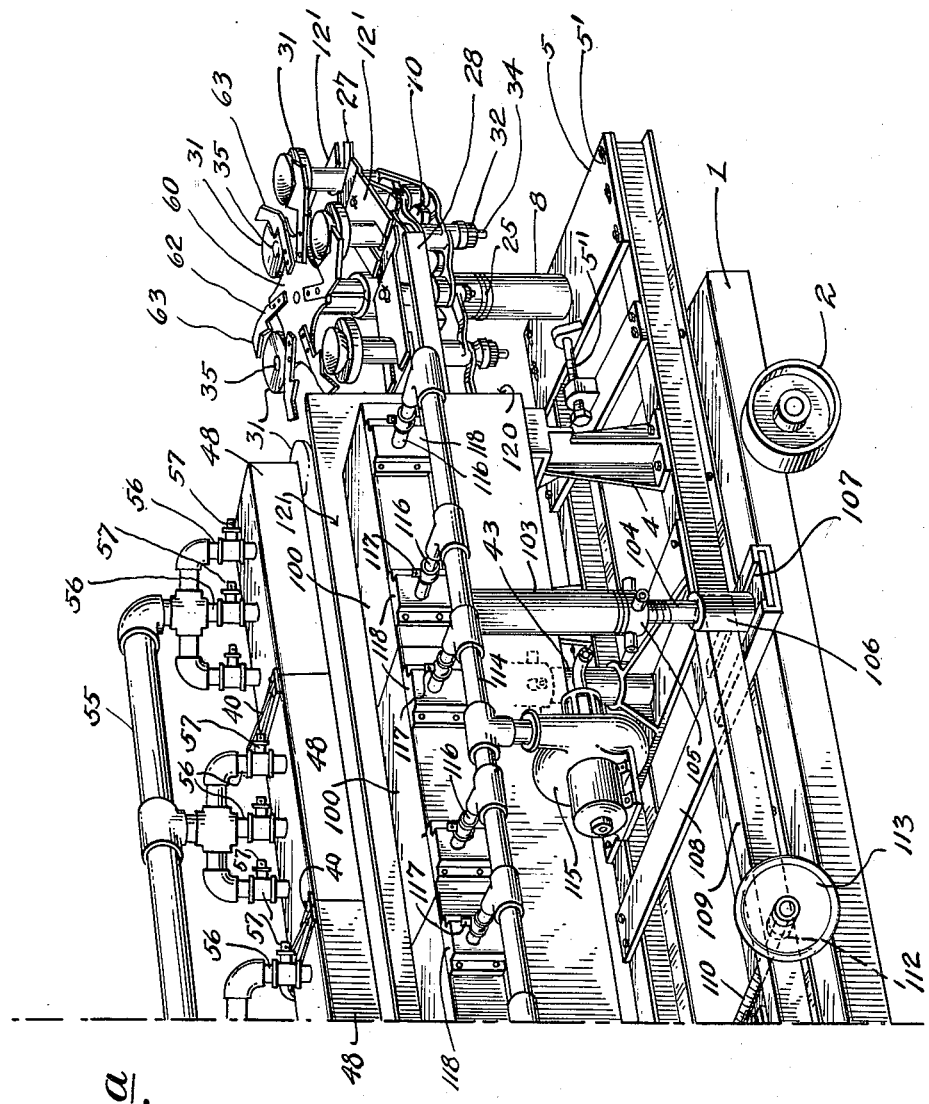

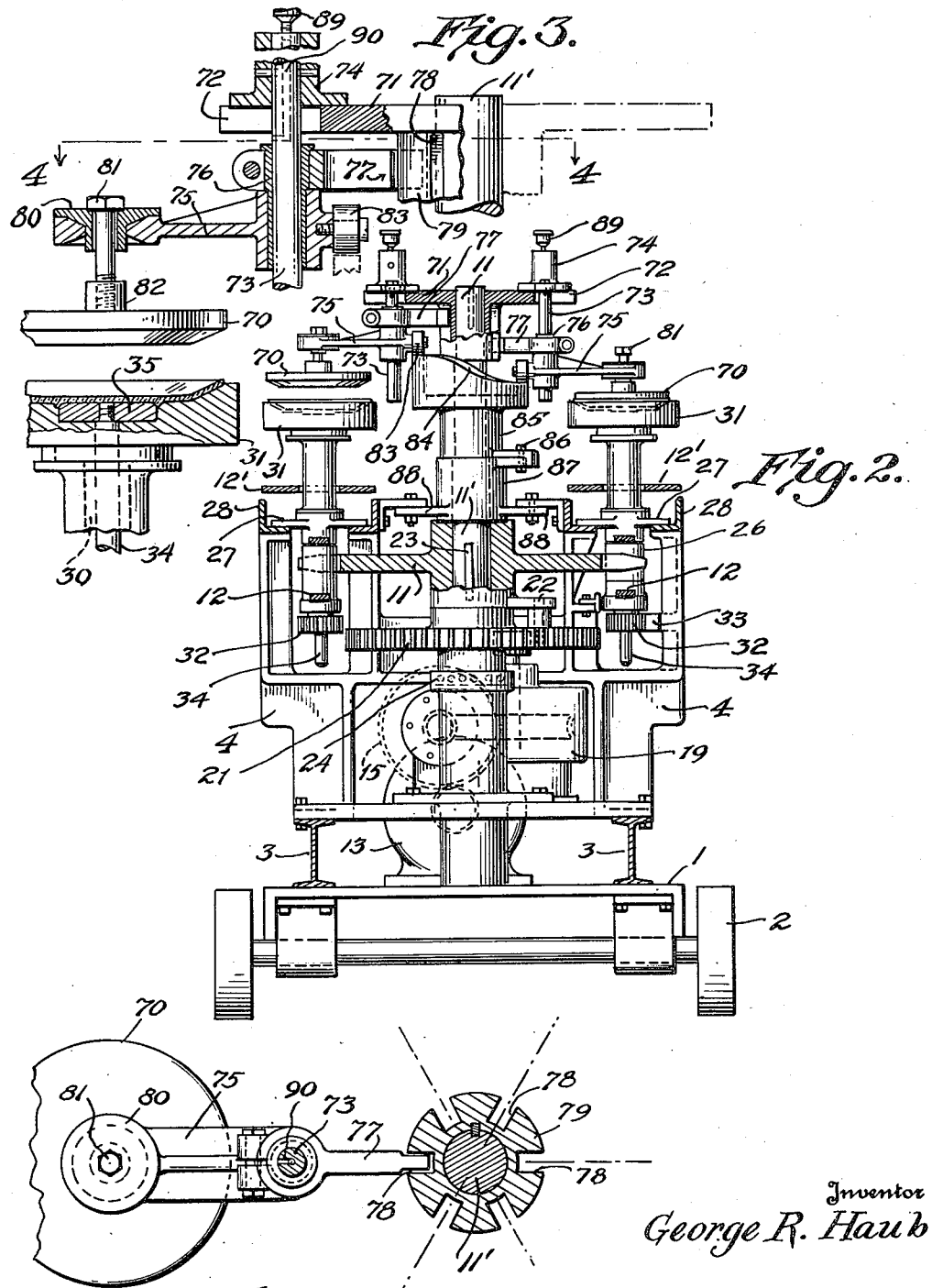

May 14, 1935.  G. R. HAUB  2,001,460
APPARATUS FOR FORMING PLATES
Filed Aug. 27, 1931  5 Sheets-Sheet 4
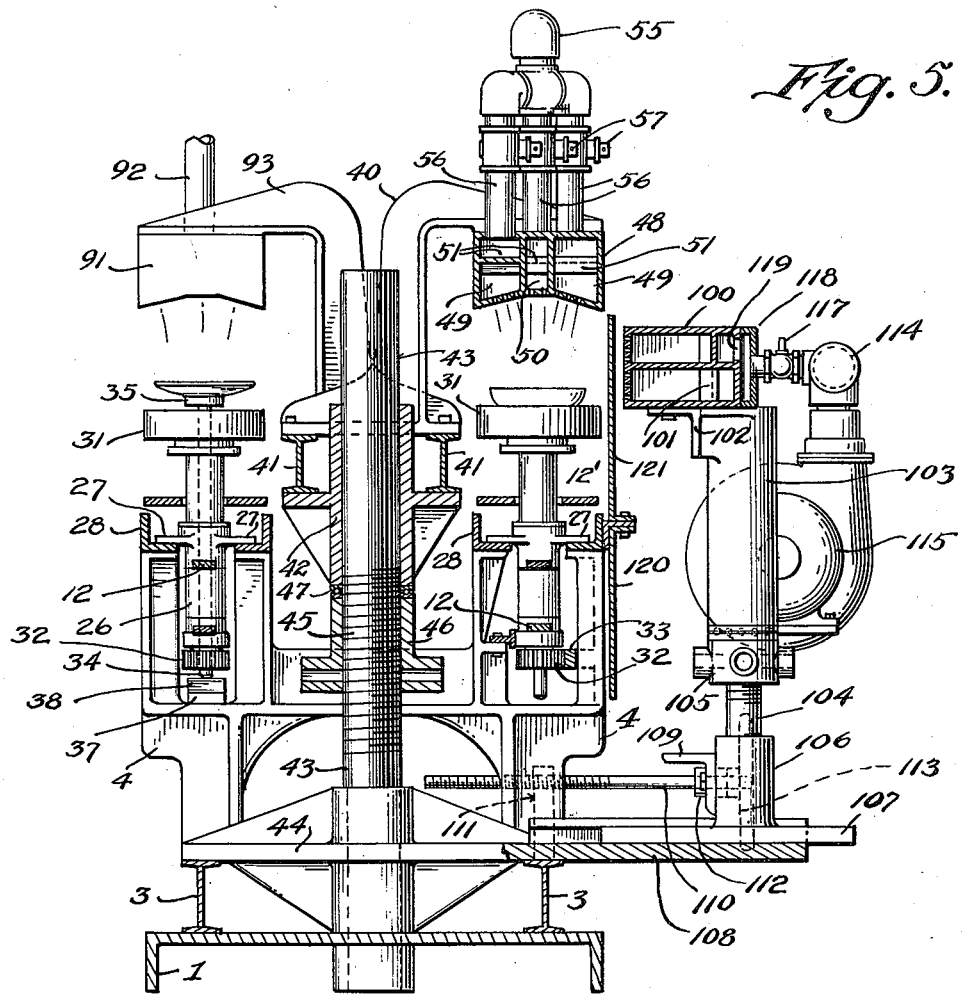
Inventor
George R. Haub
By Eccleston & Eccleston
Attorneys May 14, 1935.　　　　G. R. HAUB　　　　2,001,460
APPARATUS FOR FORMING PLATES
Filed Aug. 27, 1931　　5 Sheets-Sheet 5
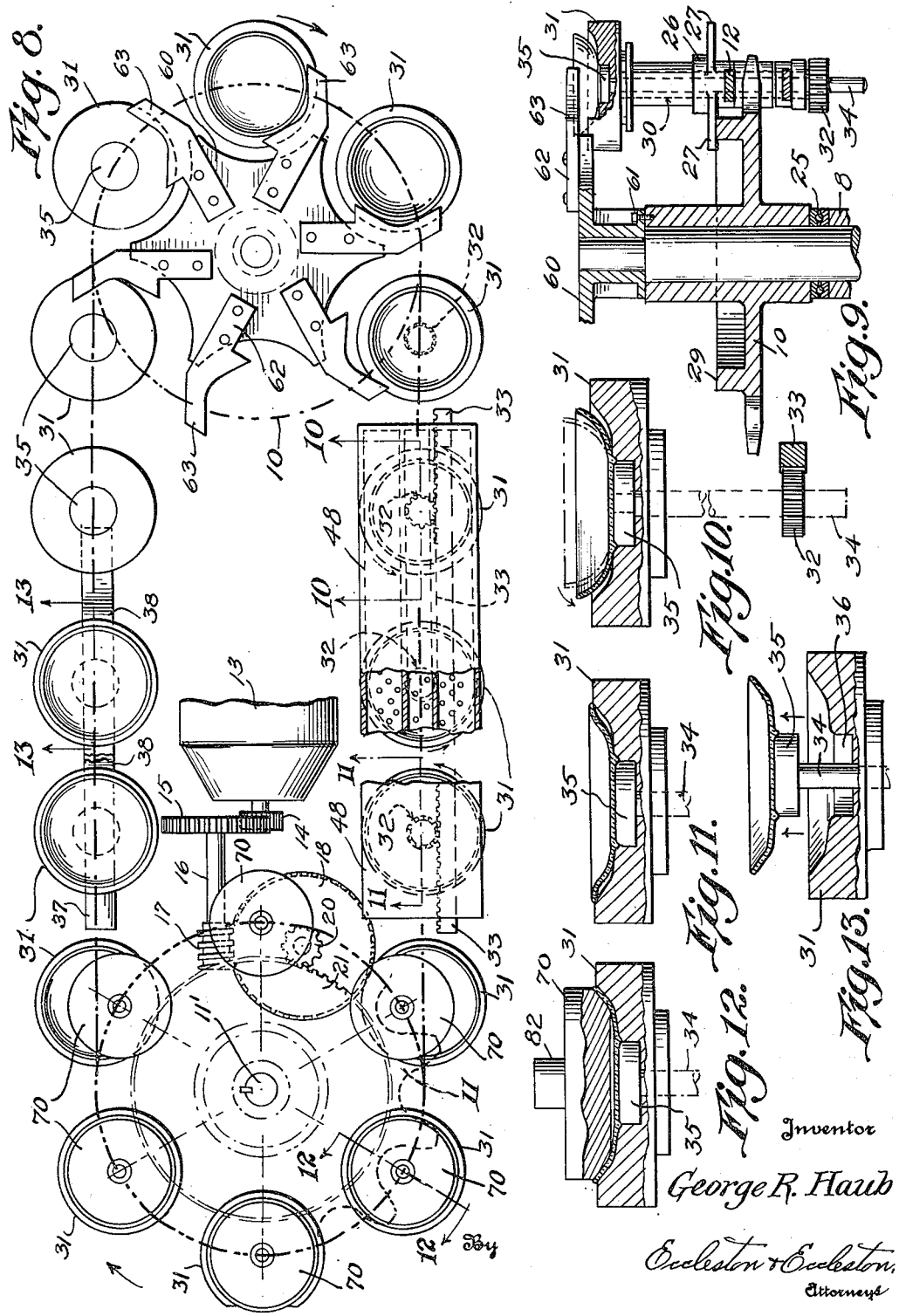
Inventor
George R. Haub
By Eccleston & Eccleston
Attorneys Patented May 14, 1935

2,001,460

UNITED STATES PATENT OFFICE 2,001,460

APPARATUS FOR FORMING PLATES

George R. Haub, Washington, Pa., assignor to Hazel-Atlas Glass Company, Wheeling W. Va., a corporation of West Virginia Application August 27, 1931, Serial No. 559,797

5 Claims. (Cl. 49—7)

This invention relates to glass treating apparatus and is especially designed to reheat and reshape glass articles which have previously been formed in the usual press mold or blow mold of a forming machine.

While it is a comparatively simple matter to form articles such as nappies and the like in a press mold, considerable difficulty has been encountered in attempting to form shallower objects such as table plates, saucers, etc. It is an object of the present invention therefore to provide an apparatus by means of which relatively deep articles such as nappies may be reheated and flattened out to form shallower objects such as saucers, plates, etc.

Another object of the invention resides in the provision of such a device which may be easily converted into a fire polisher or edge burner for ordinary ware such as drinking glasses and the like.

Other objects and advantages of the invention will be apparent from the following description when taken in connection with the accompanying drawings, in which, Figures 1 and 1a combined represent a perspective view of the complete apparatus.

Figure 2 is an end view of the device with parts broken away.

Figure 3 is an enlarged detail view of one of the flattening elements and its related parts.

Figure 4 is a horizontal sectional view taken on line 4—4 of Figure 3.

Figure 5 is a transverse sectional view through the complete apparatus.

Figure 6 is a detail view, partly in section, of one of the top burners.

Figure 7 is a perspective view, partly broken away, of one of the side burners.

Figure 8 is a more or less diagrammatic plan view of the several carriers for the ware showing their relation to the flatteners.

Figure 9 is a fragmentary sectional view through the idler sprocket wheel and related parts showing one of the articles as initially placed in its shaper, and Figures 10, 11, 12 and 13 are sectional views through one of the shapers showing the article in various stages during the reheating and flattening process.

Referring to the drawings more in detail, the numeral 1 indicates the body of a carriage or truck provided with wheels 2 which forms a support for two I-beams 3. On the beams 3 are mounted brackets 4 and plates 5, 6, and 7 on which the major portion of the apparatus to be described is mounted.

A supporting sleeve 8 and a bearing sleeve 9 are mounted on the plates 5 and 6 respectively and are provided with shafts for sprocket wheels 10 and 11. A sprocket chain 12 is connected with the sprocket wheels 10 and 11 and power is supplied to the latter by means of a motor 13. The shaft of this motor is provided with a pinion gear 14 meshing with a gear 15 on shaft 16. This shaft is provided with a worm 17 meshing with a worm wheel 18 of a reduction gearing 19. The vertical shaft of this reduction gearing is provided with a pinion 20 meshing with a gear wheel 21 fixed with respect to the sprocket wheel 11 by means of a shear pin 22. The sprocket wheel 11 is keyed to its shaft 11' as indicated by numeral 23 and ball bearings 24 serve to reduce friction in the rotative movement of the gear and sprocket wheel. An anti-friction bearing 25 is also provided for the idler sprocket wheel 10.

In order to take up any slack in the chain 12 the plate 5 is provided with slots 5' which permit a longitudinal movement of the plate through the medium of an adjusting screw 5''.

The sprocket chain 12, in the present embodiment of the invention, is provided with sixteen vertically disposed bearing members 26, each of which is provided with a pair of wings 27 which ride upon a track 28 supported on the upper ends of the brackets 4. As will be noted from an inspection of Figure 1a the track 28 terminates adjacent the right hand end of the machine and in order to support the wings 27 while the bearings 26 are rounding the sprocket wheel 10, the latter is provided with a flange 29 on which the inner of each pair of wings 27 rests. With this construction it will be apparent that the bearing sleeves 26 are prevented from wobbling as they are carried about their closed path by the sprocket chain 12. The chain is preferably guarded by a plurality of overlapping plates 12' which are connected to the upper side of the chain.

Rotatably mounted in each bearing 26 is a hollow shaft 30 to the upper end of which is rigidly secured a shallow carrier or shaper element 31. This sleeve is provided on its lower end with a pinion 32 adapted to mesh with a fixed rack 33 carried by the brackets 4 at the right of Figures 2 and 5. Extending upwardly through the hollow shaft 30 is a rod or plunger 34 provided with an ejector disc or plate 35 at its upper end. This disc normally rests in a countersunk opening 36 formed in the shaper plate, but is adapted to be raised as indicated in Figure 13 for lifting the finished article after it has been properly shaped. The means for raising the rod 34 consists of a fixed plate 37 provided with an upwardly inclined portion 38 on which the lower end of the rod 34 is adapted to ride. After leaving this raised portion the rod 34 will be lowered by its own weight and will thus bring the ejector disc back into the countersunk seat 36 in the shaper 31.

The burners for softening the walls of the nappy or berry bowl or the like, which is to be reshaped into the form of a substantially flat plate, are supported on a plurality of brackets 40 which are in turn supported on I-beams 41. These beams are supported on sleeves 42 slidably mounted on rods or pillars 43, the latter being supported on plates 44 carried by the I-beams 3. The members 43 are provided with screw threads 45 for receiving nuts 46 which support the sleeves 42 and provide a means for raising and lowering the sleeves as may be desired. A ball bearing race 47 is disposed between each sleeve 42 and nut 46 to reduce friction between these members.

The top burner which is supported by the brackets 40 comprises a plurality of units one of which is shown in Figure 6 and is indicated by numeral 48. Each of these burner sections is preferably provided with three compartments, namely, side compartments 49 and an intermediate compartment 50, and each compartment is provided with a baffle plate 51 so as to cause the gases to be projected throughout the length of the compartment. The main gas line for these burners is shown in Figure 1 and is designated by the numeral 52. This pipe enters a mixing chamber 53 which is provided with an air inlet 54 and the mixed gases are carried through manifolds 55 to the branch lines 56. One of the branch pipes is connected with each of the chambers 49—50 at the point at which the baffle 51 is mounted and each branch pipe is provided with a valve 57. It will be apparent therefore that the burners may be used in their entirety or by closing off appropriate valves 57, the center compartment alone may be used as a burner or the two side compartments only may be used as burners. It will also be obvious that by suitably adjusting the nuts 46 the burners 48 may be raised or lowered to adjust them to ware of different heights.

The burners 48 just referred to are supported directly above the path of travel of the shaper plates 31 as clearly indicated in Figures 5 and 8 and it is also to be noted that the rack bar 33 is disposed vertically below the burner so as to impart a rotary movement to the shapers 31 as they are carried beneath the burners.

In Figures 10, 11 and 12 the article being reshaped is shown in the various stages of reshaping operations and it will be noted that in order to obtain the best results it is essential that the article be exactly centered with respect to the shaper 31. To this end a centering head 60 is disposed on the upper end of the shaft of the idler sprocket 10 and is connected to the hub by a shear pin 61. Radiating from the head 60 are a plurality of rigidly secured arms 62 provided with V-shaped centering plates 63. These plates are placed about the periphery of the centering head 60 so as to be disposed adjacent the edges of the shaper elements 31 as they pass around the sprocket wheel 10, and it will be obvious that if the operator places the article to be reshaped with its edges in contact with the notched portion of the plate 63 the article will be properly centered with respect to the shaper 31.

Again referring to Figures 10, 11, and 12 which show various stages of the reshaping process, it will be noted that while the walls of the article tend to collapse when softened by the heat from the burners 48, the intermediate portion of the wall (Figure 11) does not descend into complete contact with the shaper. Hence it is highly desirable that some means be provided for forcing the wall of the softened article into contact with the shaper in order to produce in the article the identical shape or contour of the shaping member. For this purpose a plurality of disc shaped flattening members 70 are provided, there being six of these members indicated in the present embodiment of the invention.

Keyed to the upper end of the shaft of the sprocket wheel 11 is a carrier disc 71 provided with six radial slots 72 through which guide rods 73 are suspended by means of bosses 74. Slidably mounted on each guide rod 73 is an arm 75 secured on a bushing 76. Also secured on the bushing 76 is an index or control finger 77 which has its inner end disposed in a groove 78 formed in the hub 79 of the carrier disc 71. Disposed within an opening in the outer end of each arm 75 is a guide member 80 through which a bolt 81 loosely extends, and the flattener disc or weight 70 is provided with a hub 82 which is threaded onto the lower end of the bolt. This loose connection between the arm 75 and the flattener disc 70 allows a limited freedom of movement of the flattener disc with respect to the arm, thereby permitting the disc to rest freely on the article being reshaped, and also allowing for any irregularities of movement of the shapers 31 as they are carried around with the sprocket wheel 11.

On the inner end of each arm 75 is a roller 83 for cooperation with a cam 84 formed on the upper end of a sleeve 85. This sleeve 85 surrounds the shaft of the sprocket wheel 11, but is held against rotation by a shear pin 86 which connects it with a sleeve 87. The sleeve 87 is provided with arms 88 which are bolted to brackets carried by the two branches of the track 28 and serve to tie the same together in fixed position.

The fixed cam 84 causes the arms 75 to be periodically raised and lowered as they travel around with the sprocket wheel 11 and thus lower the flattener disc into cooperative relation with the shaper member and then raise the same. In order to properly lubricate the sliding parts on the rod 73, a grease cup 89 is mounted in the upper end of each rod and communicates with an L-shaped channel 90 which serves to convey the lubricant to the sleeve or bushing 76.

After the flattener discs 70 are raised from the shapers it is desirable that the ware be slightly cooled so as to set prior to removal from the shapers and for this purpose a cooler 91 is provided. This member is of box-like construction very similar to the burners 48 and is adapted to project cooling air on the surface of the ware after it is carried thereunder. The cooling air is carried to the member 91 by a manifold 92 and it is supported in position on brackets 93 which are mounted on I-beams 41 which also carry the brackets 40 for the burners 48. It will be understood therefore that the cooler 91 may be vertically adjusted to suit ware of various heights or may be raised entirely out of cooperative relation with the apparatus, as may be desired.

It will sometimes be advantageous to use the present apparatus as a fire polisher, and to this end a side burner 100 provided with upper and lower compartments is installed on the carriage body 1. This burner is composed of a plurality of sections arranged in horizontal alignment and each section is provided with upper and lower compartments provided with baffles 101. The burner sections are mounted on an L-shaped bracket 102 which is in turn supported on sleeves 103. These sleeves are slidably connected with threaded rods 104 and may be raised or lowered by means of nuts 105 which are threaded on the rods. Rods 104 are fixedly secured in socket members 106 which are secured to plates 107. These plates 107 are slidably mounted on base plates 108 secured to I-beams 3 and permit the burner 100 to be moved laterally toward and away from the path of travel of the shapers or other ware carriers mounted on the sprocket chain 12. The socket members 106 are connected by an L-shaped bar 109 which causes them to move in unison, and a screw threaded rod 110 serves to impart movement to this bar. The rod 110 is threaded into a lug 111 fixed to the I-beam 3 and is provided with collars 112 disposed on opposite sides of the bar 109. A hand wheel 113 serves to rotate the rod 110 and obviously its rotation will carry the socket members 106 and the burner 100 supported therein inwardly and outwardly as may be desired.

The burner 100 is supplied with fuel by means of a manifold 114 associated with a mixer 115, and branch manifolds 116 provided with valves 117 communicate with the upper and lower compartments of the burner. These branch manifolds 116 are connected with box like plates 118 which may be bolted to the rear of the burner and in turn communicate with openings 119 formed in the rear walls of the burner sections. By reason of this particular connecting means for the branch manifolds, any irregularities in the formation of the parts are readily taken care of.

These upper and lower sections of the side burners serve to project the flames against the top and middle sections of the articles to be glazed and thereby serve to fire ploish the side walls of the article as well as to provide a smooth finish for the upper edge thereof. When deemed desirable these side burners may be used as auxiliary burners in softening the walls of articles which are to be reshaped into substantially flat articles such as plates, saucers, etc. Moreover, the top burners or a portion thereof may be used in conjunction with the side burners when using the device as a fire polisher.

Upper and lower guard plates 120 and 121 of asbestos or the like are bolted to the track 28 and serve to shield the workmen from the heat of the apparatus. However, when the side burner 100 is to be put in use the upper plate 121 may be readily removed.

In operation, the shapers are continuously carried around the oval path (Figure 8) by means of motor 13 and associated parts. After the nappies, berry bowls, or the like are formed in the forming machine they are carried to the shapers 31 and centered therein by means of the V-shaped guides 63. The articles then pass under burners 48 and are rotated by means of rack 33 and pinions 32. This rotation of the articles causes an equal distribution of heat over their walls which gradually flatten out as indicated in Figures 10 and 11. As heretofore mentioned, the intermediate portions of the wall will not ordinarily descend by gravity into contact with the shaper and hence the flattener discs or weights 70 are provided. These discs are lowered by means of cam 84 onto the article shortly after its carrier leaves the rack 33 and hence has discontinued its rotation. The weight of the flattener 70 is sufficient to cause the softened walls to take the form of the shaper, as indicated in Figure 12, and as the article continues its travel around the sprocket wheel 11, the cam 84 again raises the flattener disc by means of arm 75 and the reshaped article then passes under the jets of cooling air projected downwardly from the cooler 91. The rod 15 or plunger 34 traveling on the cam plate 37 then raises the ejector disc 35 and lifts the reshaped article out of the shaper 31 as indicated in Figure 13, thereby permitting its ready removal. The ejector 35 is then allowed to descend into its recess 36 of the shaper which continues on its path to receive another article for reshaping. It is to be noted that the arms 75 carrying the flattener discs are each provided with separate index fingers 77 which move in slots 78 and 79 of carrier disc 71. This combination of the index finger with the arm 75 permits of an accurate adjustment of the flattener discs with respect to the shapers 31 so that these elements may be properly centered at all times.

The present device may be readily converted into a fire polisher for various types of ware by merely employing the side burners 100 and rendering the top burner or a portion thereof and the cooler inactive. In this use of the device as a fire polisher, the heat shield plate 121 is of course removed and the side burner 100 raised to the proper height to suit the ware being polished, by means of nuts 105. Moreover, the horizontal distance of the side burner 100 from the ware being carried through the apparatus is adjusted to suit the ware by means of screw shaft 110 which slides the plates 107 inwardly and outwardly in their guides 108.

From the foregoing description taken in connection with the accompanying drawings, it will be apparent to those skilled in the art that I have devised a method and apparatus for producing shallow articles such as saucers, plates, and the like, which is very simple in operation; that mechanical means are provided for centering the articles to be reshaped; that means are provided for maintaining a proper centering of the flattener discs with respect to the shapers; that the ware is sufficiently cooled to cause it to set prior to being ejected from the shapers and that the entire device may be easily and quickly converted into a fire polisher by a few simple adjustments.

In accordance with the patent statutes, I have described what I now believe to be the preferred form of the apparatus, but it is to be understood that certain minor changes may be made in the details of construction without departing from the essential features of the invention and all such changes are intended to be included within the scope of the appended claims.

What I claim is:

1. Apparatus of the class described including a plurality of traveling shapers, a sprocket chain and sprocket wheels for imparting movement to the shapers, and guide means associated with one sprocket wheel for properly centering articles placed in the shapers.

2. Apparatus of the class described including a plurality of traveling shapers, a sprocket chain and sprocket wheels for imparting movement to the shapers, a plate keyed to the shaft of one of said sprocket wheels and centering arms or guides secured to said plate for properly centering articles placed in the shapers.

3. Apparatus of the class described including a plurality of traveling shapers, a sprocket chain and sprocket wheels for imparting movement to the shapers, a heater disposed above the path of travel of the shapers and means traveling with one of said sprocket wheels for contacting articles carried under said burner.

4. Apparatus of the class described including a plurality of traveling shapers, a sprocket chain and sprocket wheels for imparting movement to the shapers, a heater disposed above the path of travel of the shapers, means associated with one of said wheels for centering articles placed in the shapers, and means associated with the other sprocket wheel for flattening the heated articles carried by the shapers.

5. Apparatus of the class described including a plurality of traveling shapers, sprocket wheels and a sprocket chain for imparting movement to the shapers, a heater disposed above the path of travel of the shapers, a carrier concentrically arranged with respect to one of said sprocket wheels, said carrier including a plurality of vertically movable arms, a plate mounted for vertical sliding movement in each of said arms, a keyed connection between said sprocket wheel and carrier whereby the plates are caused to travel with the shapers about said sprocket wheel, and a cam for periodically raising and lowering the arms.

GEORGE R. HAUB.